United States Patent
Gorden (10) Patent No.: US 6,203,039 B1
(45) Date of Patent: *Mar. 20, 2001

(54) INDEPENDENT SUSPENSION SYSTEM WITH IMPROVED VERTICAL ALIGNMENT AND RANGE OF TRAVEL

(76) Inventor: Marvin J. Gorden, P.O. Box 12783, Wichita, KS (US) 67277

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,185

(22) Filed: May 12, 1998

(51) Int. Cl.[7] .................................................. B60G 1/04
(52) U.S. Cl. ................ 280/124.157; 280/124.1; 280/124.11
(58) Field of Search ................. 280/124.1, 124.109, 280/124.11, 124.116, 124.125, 124.128, 124.129, 124.13, 124.134, 124.135, 124.15, 124.151, 124.153, 124.157, 124.152, FOR 145, FOR 147, FOR 155, FOR 159, FOR 162, FOR 168, FOR 170, 91.1, 99

(56) References Cited

U.S. PATENT DOCUMENTS

| | | | |
|---|---|---|---|
| 2,509,803 | * | 5/1950 | Booth . |
| 5,353,988 | | 10/1994 | Gallenberg ............................ 239/164 |

FOREIGN PATENT DOCUMENTS

| | | | |
|---|---|---|---|
| 1057469 | * | 9/1959 | (DE) ............................. 280/FOR 159 |
| 705114 | * | 3/1954 | (GB) ............................. 280/FOR 147 |
| 1-28012 | * | 1/1989 | (JP) ............................. 280/FOR 145 |
| 541685 | * | 3/1977 | (SU) ............................. 280/FOR 147 |

OTHER PUBLICATIONS

Ford Truck Parts, Illustration Section 30, p. 3 Front Axle & Front Susension 1965/69 Fl00/250 Jan. 1975.

* cited by examiner

Primary Examiner—Eric Culbreth
(74) Attorney, Agent, or Firm—Flanagan & Flanagan; John R. Flanagan; John K. Flanagan (57) ABSTRACT

An independent suspension system for a vehicle includes a pair of wheel-supporting axle beams extending in oblique relationships to longitudinally-extending opposite sides of the vehicle chassis which permit independent vertical pivotal movements of the axle beams that allow extended ranges of vertical travel of the vehicle wheels supported on one ends of the axle beams, a pair of radius arms pivotally connected at opposite ends to the chassis sides and to the one ends of the axle beams adjacent to their connections to the wheels so as to control fore and aft movement of the axle beams during their vertical pivotal movements and to maintain the wheels close to true vertical alignment with a vertical reference over their extended range of vertical travel, a pair of torque links pivotally interconnected at opposite ends to the chassis sides and other ends of the axle beams to counteract rotational forces introduced to the axle beams by the acceleration and braking of the vehicle, and a pair of air bags disposed adjacent each of the one ends of the axle beams adjacent to the pivotal connections thereof to the chassis sides, the air bags being supported under the chassis sides along opposite sides of the one ends of the axle beams by brackets attached to and extending in opposite directions from the one ends of the axle beams.

5 Claims, 6 Drawing Sheets

INDEPENDENT SUSPENSION SYSTEM WITH IMPROVED VERTICAL ALIGNMENT AND RANGE OF TRAVEL

BACKGROUND OF THE INVENTION

1. Field of the Invention

The present invention generally relates to independent suspension systems for vehicles and, more particularly, is concerned with an independent suspension system with improved vertical alignment and range of travel.

2. Description of the Prior Art

Various independent suspension systems for vehicles are known in the prior art. One example is the independent suspension system provided on model F-100 and F-250 trucks by Ford Motor Company as early as 1975. More recently, an agricultural boom sprayer illustrated and described in U.S. Pat. No. 5,353,988 to Gallenberg adopted a substantially similar independent suspension system as originally provided in the Ford trucks.

The independent suspension system on the Ford truck and Gallenberg boom sprayer includes a pair of generally horizontally-disposed elongated axle members for supporting a pair of vehicle wheels adjacent to opposite sides of the vehicle chassis. Each of the axle members independent of one another interconnects a corresponding one of the rotatable wheels with an opposite side of the chassis. One end of the each axle member is pivotally connected to the one rotatable wheel via a kingpin assembly while the opposite end of each axle member is pivotally connected to the one opposite side of the chassis. The axle members are generally straight, extend parallel to one another and pivot in generally parallel vertical planes.

The independent suspension system on the Ford truck and Gallenberg boom sprayer also includes a pair of stabilizing bars or struts interconnecting the axle members at their one ends with portions of the opposite sides of chassis longitudinally spaced from the side portions of the chassis where the axle members are pivotally connected at their other ends. Particularly, each strut is rigidly secured to the one end of the respective axle member relative to vertical pivotal movement thereof and pivotally connected to the longitudinally spaced side portions of the chassis.

The independent suspension system on the Ford truck and Gallenberg boom sprayer further includes spring means positioned between the chassis and the one end of each axle member for cushioning the vehicle as it traverses the terrain. The spring means on the Ford truck is a heavy coiled spring whereas the spring means used on the Gallenberg boom sprayer is an air bag.

The above-described prior art independent suspension system appears to provide adequate stability for the limited range of vertical travel of the suspension system, such as a few inches up or down from a neutral position, required in the vehicles using the design. However, this prior art suspension system is not seen to provide adequate stability for heavier vehicles where a significantly greater range of vertical travel of the suspension system is required from the neutral position. Furthermore, because the stabilizing struts are fixed to the axle member, the vertical alignment of the centers of the wheels relative to a vertical reference substantially changes as the wheels move away from (above or below) the neutral position. This change is tolerable in the case of lighter vehicles where the required range of vertical travel is slight. This change would not be tolerable in the case of heavier vehicles where the required range of vertical travel is much greater.

Consequently, a need exists for an independent suspension system which will accommodate the conditions and requirements encountered with heavier vehicles.

SUMMARY OF THE INVENTION

The present invention provides an independent suspension system designed to satisfy the aforementioned need. The independent suspension system of the present invention provides a pair of axle beams which extend in oblique relationships to the longitudinally-extending opposite sides of the vehicle chassis permitting independent vertical pivotal movements thereof that allow for an extended range of vertical travel of each of the wheels, for instance, about two feet at the centers of the wheels compared to a few inches in the case of the prior art independent suspension system. Thus, from a neutral position each wheel can move up about twelve inches and down about twelve inches before reaching upper and lower limits.

The independent suspension system of the present invention also provides a pair of radius arms each pivotally connected at opposite ends to the chassis and to the one end of each axle beam adjacent to where the axle beam is pivotally connected to one of the wheels so as to control fore and aft movement of axle beam during its vertical pivotal movement and to maintain the vertical pivotal axis between the one end of each axle beam and the one wheel closer to true vertical alignment with a vertical reference over the greater range of vertical travel than in the case of the prior art independent suspension system.

The independent suspension system of the present invention further provides a pair of torque links each pivotally interconnected at opposite ends to the chassis and the other end of each axle beam so as to counteract rotational forces introduced to the axle beam by the acceleration and braking of the vehicle. The torque links in being located adjacent to the other ends of the axle beams where the axle beams are pivotal connected to the chassis sides cause only minimal vertical tilting of the vertical pivotal axes to occur at the one ends of the axle beams.

The independent suspension system of the present invention still further provides spring means in the form of a pair of air bags disposed adjacent each of the one ends of the axle beams adjacent to their pivotal connections about vertical pivotal axes to the respective rotatable wheels. The air bags are supported under each of the chassis sides along opposite sides of each of the one ends of the axle beams by brackets attached to and extending in opposite directions from the opposite sides of the one ends of the axle beams.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Referring to the drawings and particularly to FIGS. 1 to 4, there is illustrated an independent suspension system of the present invention, generally designated 10, employed with a chassis, generally designated 12, and both front and rear pairs of rotatable wheels 14 of a mobile grain cart or any other vehicle. The chassis 12 has a pair of longitudinally-extending laterally spaced apart opposite sides in the form of a pair of opposite longitudinal side rail members 16 and a plurality of longitudinally spaced apart cross rail members 18 which extend between and rigidly interconnect the longitudinal side rail members 16. In view that the independent suspension system 10 employed with the front pair of rotatable wheels 14 is identical to that employed with the rear pair of rotatable wheels 14, only the front independent suspension system 10 needs to be discussed hereinafter. The references numbers that are used to identify the same components of both systems are applied in the drawings to the rear suspension system 10 as well.

Figure 1:
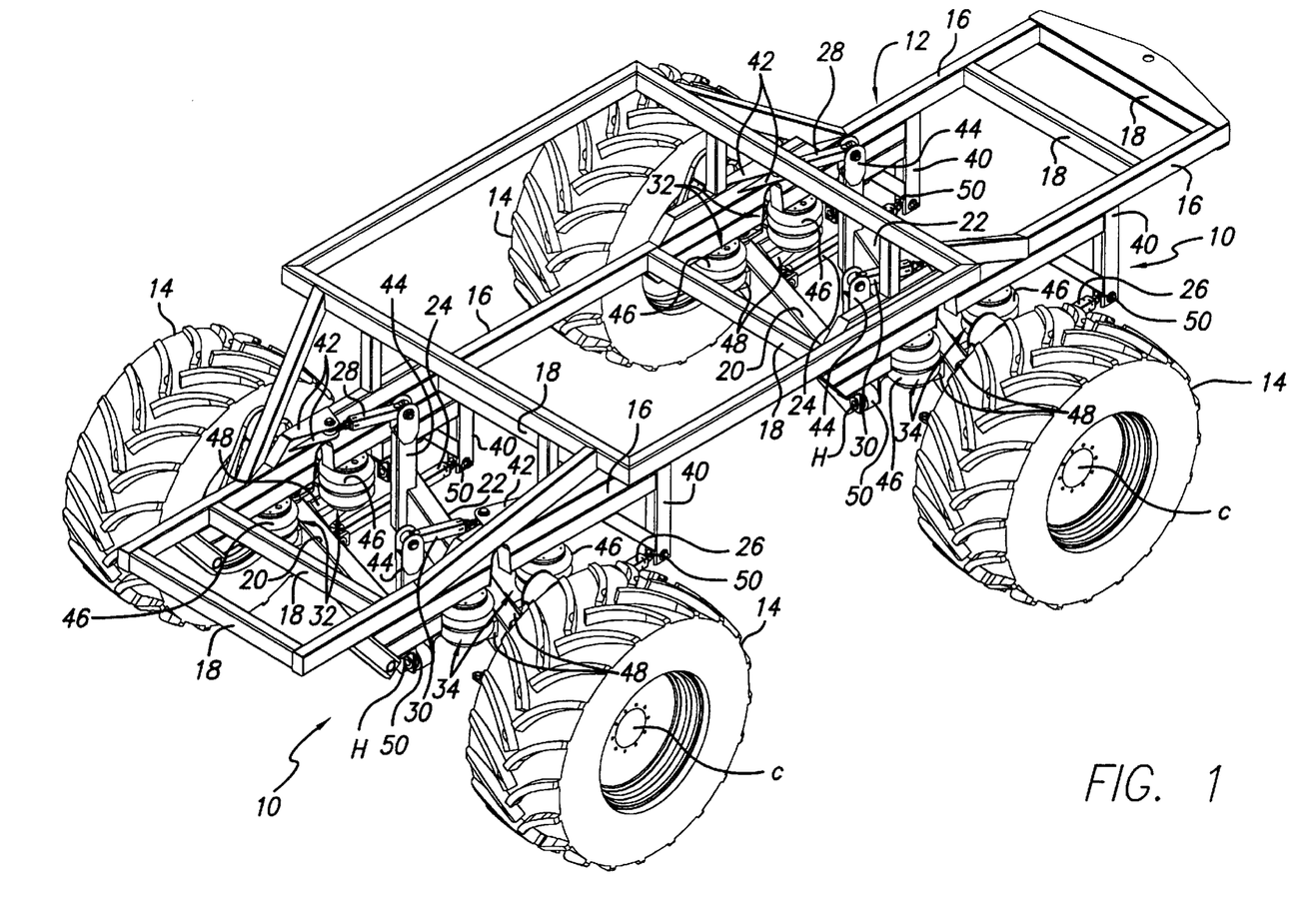
FIG. 1 is a front perspective view, as seen from above, of a mobile chassis of a vehicle having an independent suspension system in accordance with the principles of the present invention.
Figure 2:
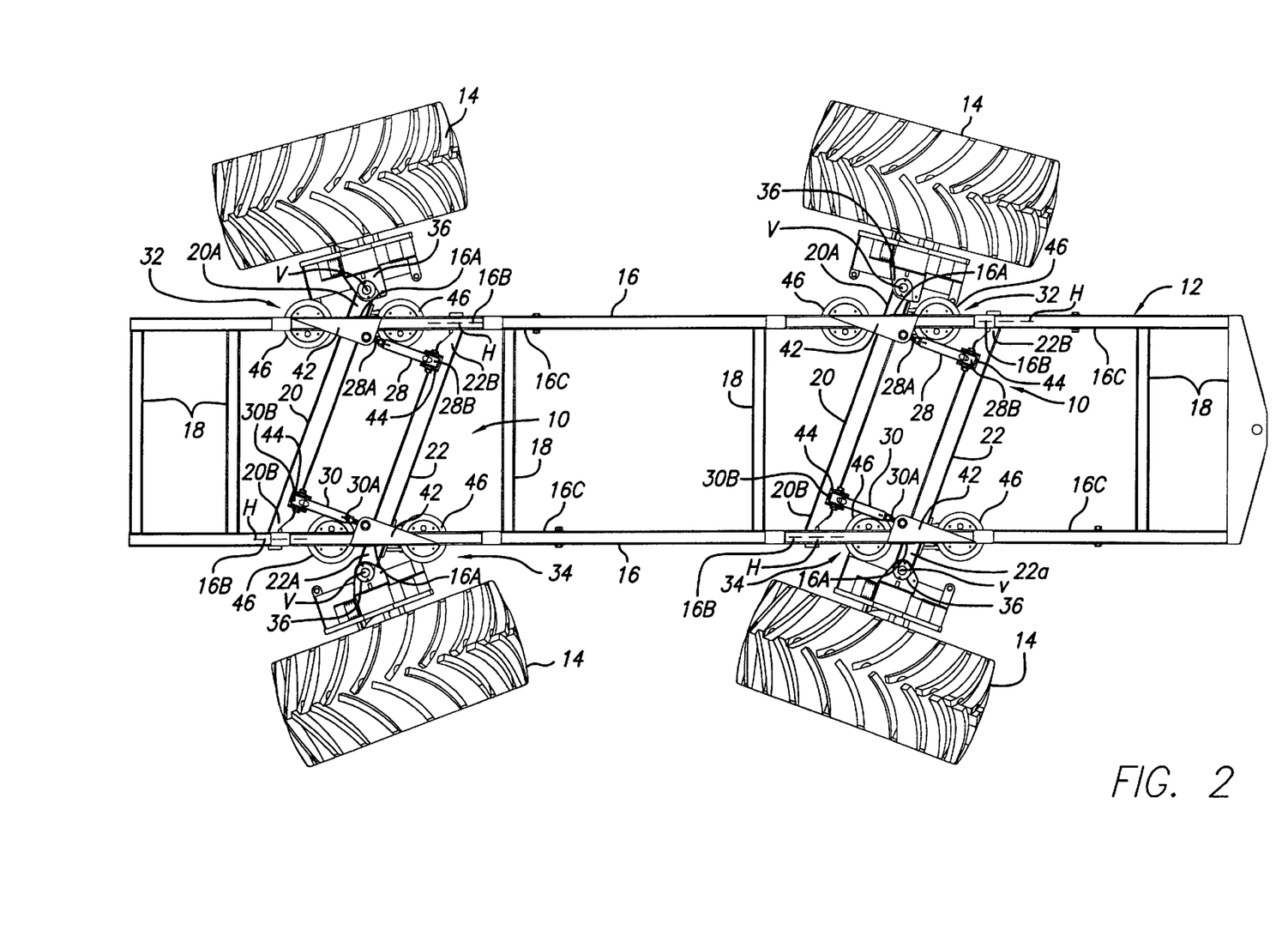
FIG. 2 is a top plan view of the mobile chassis of FIG. 1 with the independent suspension system of the present invention.
Figure 3:
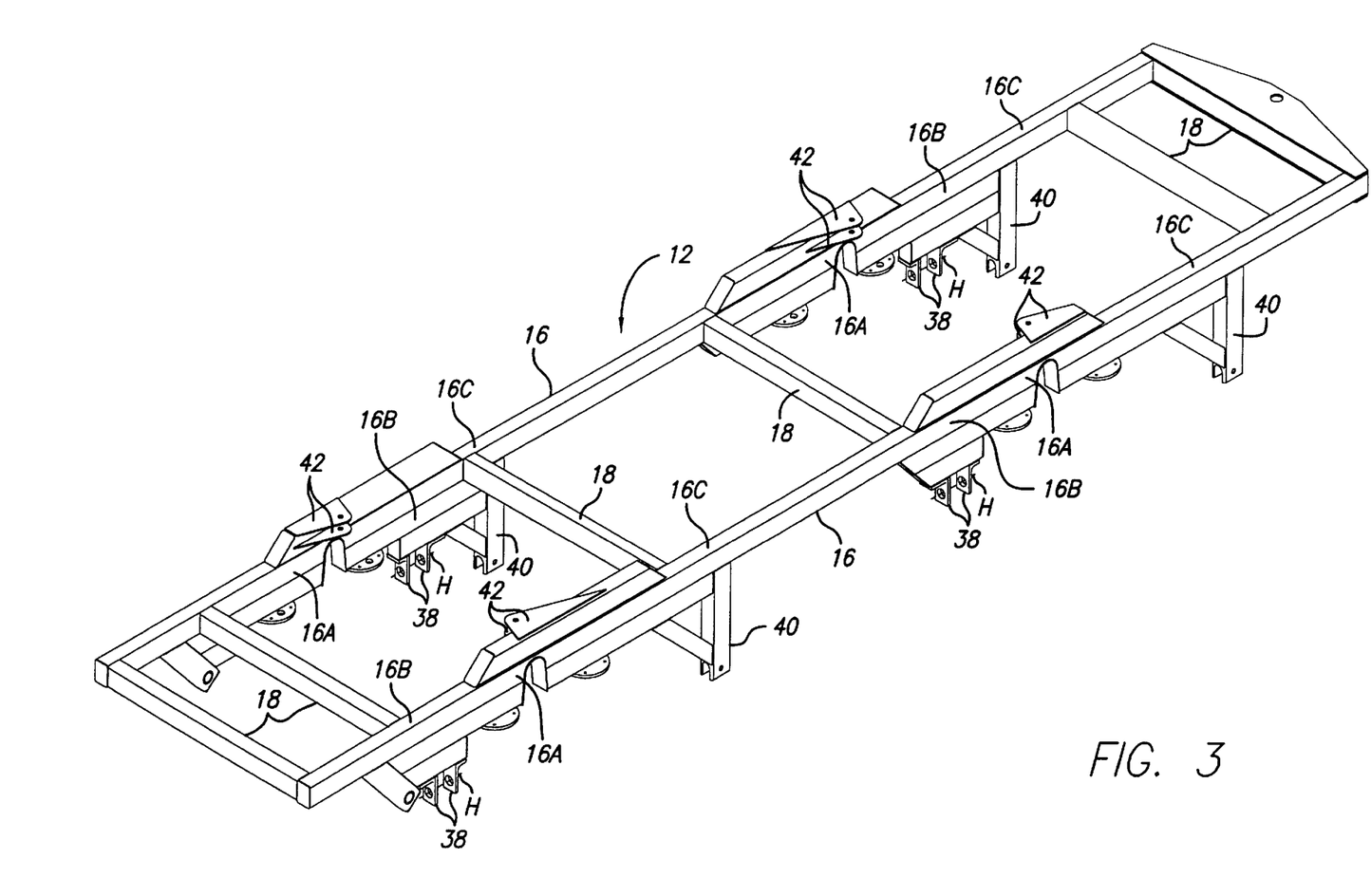
FIG. 3 is a front perspective view, as seen from above, of the chassis without the wheels and suspension system.
Figure 4:
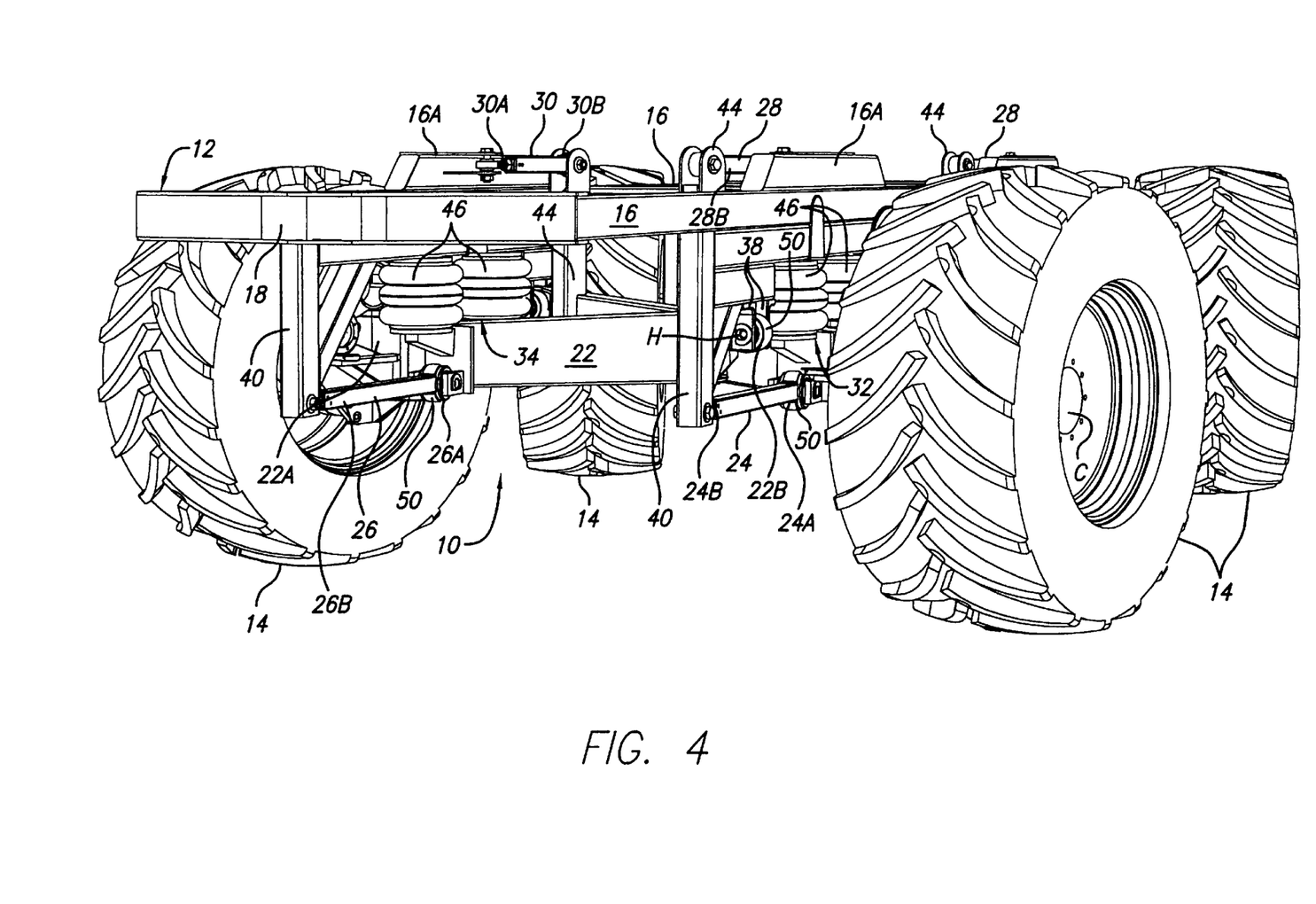
FIG. 4 is a rear perspective view seen at the elevation of the mobile chassis with the suspension system of FIG. 1.
Figure 5:
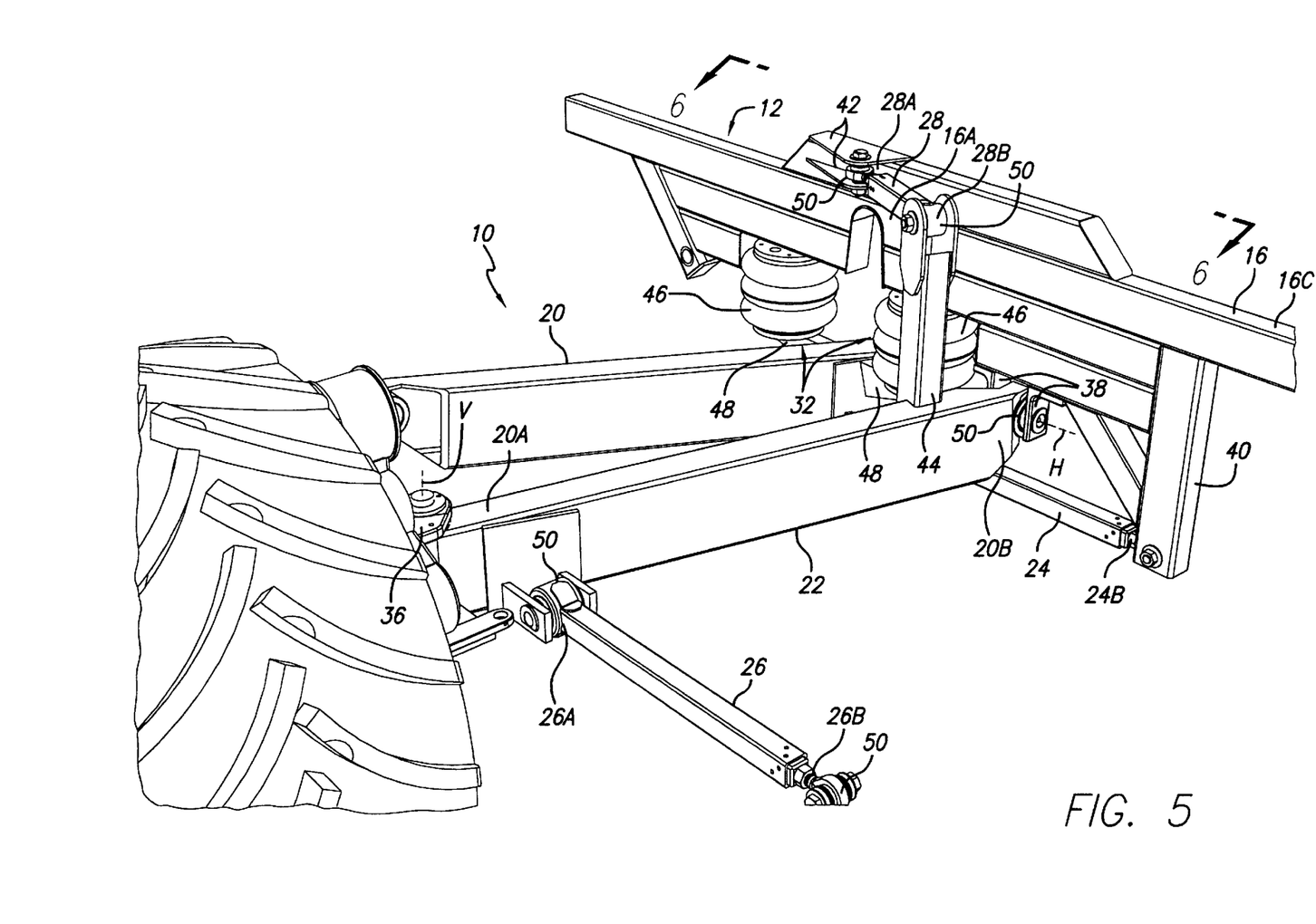
FIG. 5 is an enlarged fragmentary perspective view of the suspension system taken from behind either the left front or rear wheel as seen in FIG. 1.
Figure 6:
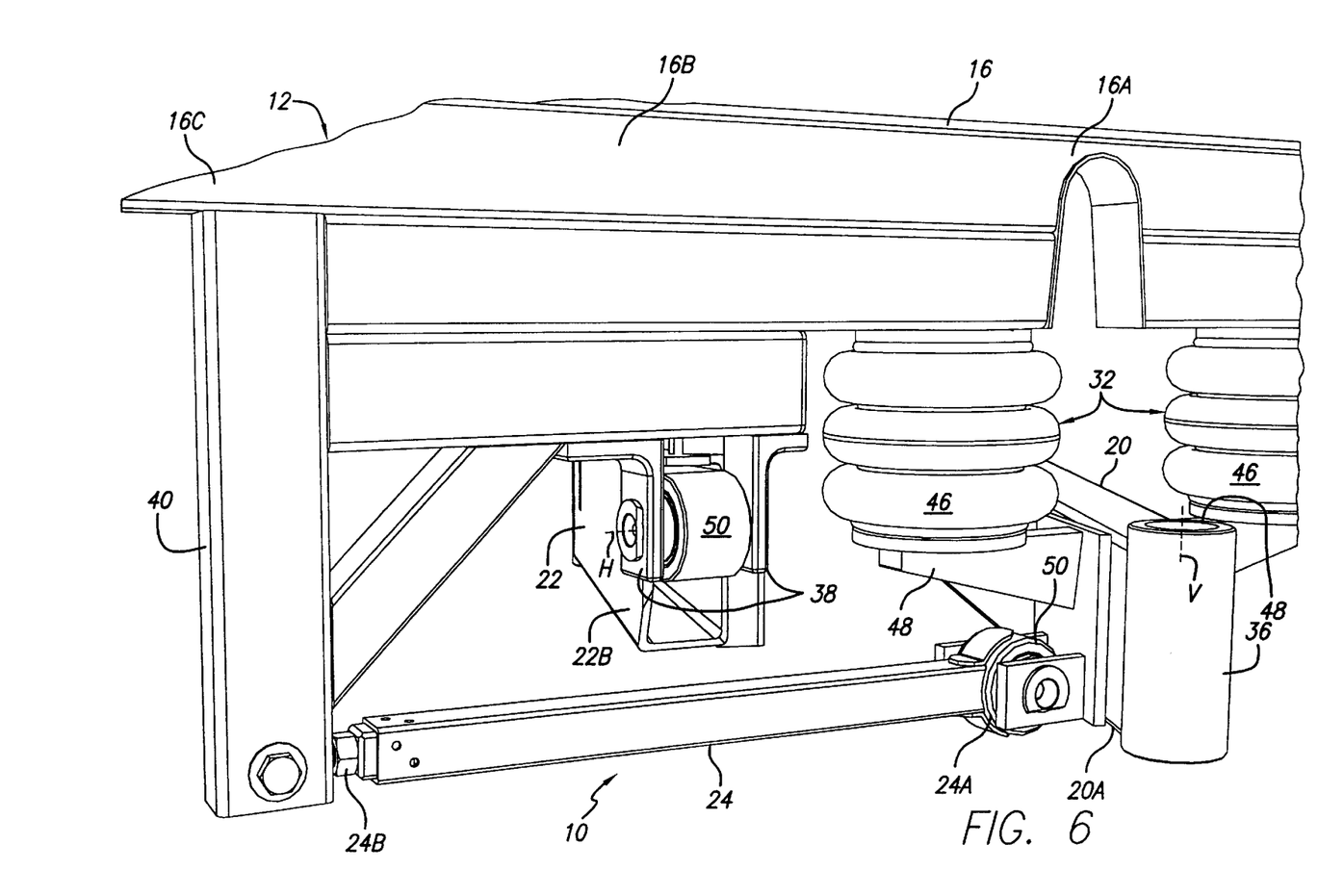
FIG. 6 is another fragmentary perspective view of the suspension system as seen along line 6—6 of FIG. 5.

Referring to FIGS. 1 to 6, basically the independent suspension system 10 includes elongated forward and rearward axle beams 20, 22, elongated right and left radius arms 24, 26, elongated right and left of torque links 28, 30, and right and left spring means 32, 34. The designations "forward", "rearward", "front", "rear", "right" and "left" are determined with the reader standing at the right or rear end of the chassis 12 as seen in FIG. 1 and facing toward the front or left end thereof. The forward and rearward axle beams 20, 22 of the suspension system 10 are arranged obliquely relative to the opposite longitudinal side rail members 16 of the chassis 12 for permitting the axle beams 20, 22 to undergo separate and independent vertical pivotal movements that allow an extended range of nearly true vertical travel of each of the wheels 14. For example, in the illustrated exemplary embodiment of a mobile grain cart, the extended range of vertical travel is about two feet at the centers C of the wheels 14. In other words, from a neutral position each wheel 14 can move up about twelve inches and down about twelve inches before reaching upper and lower limits.

More particularly, the elongated forward and rearward axle beams 20, 22 are generally straight, extend generally parallel to one another and pivot in generally parallel vertical planes. The forward and rearward axle beams 20, 22 are generally horizontally-disposed and each is independent of one another. At one end 20A, 22A of each of the axle beams 20, 22 is supported one of the rotatable wheels 14 adjacent to a first portion 16A of a respective one of the opposite longitudinal side rails 16 of the chassis 12. At an opposite other end 20B, 22B, each of the axle beams 20, 22 interconnects the one rotatable wheel 14 with a second portion 16B of the respective other of the opposite longitudinal side rails 16.

Further, the one ends 20A, 22A of the axle beams 20, 22 are pivotally connected by a pair of kingpin assemblies 36 to the respective rotatable wheels 14 for the latter to be able to undergo horizontal pivotal movement relative to the one ends 20A, 22A of the respective axle beams 20, 22 about generally vertical pivotal axes V defined by the kingpin assemblies 36. The other ends 20B, 22B of the axle beams 20, 22 are pivotally connected to pairs of hangers 38 fixed to and depending from the respective second portions 16B of the longitudinal side rail members 16 for the axle beams 20, 22 to be able to undergo vertical pivotal movement relative to the respective side rail members 16 about generally horizontal pivotal axes H defined by the hangers 38. The first portion 16A of one longitudinal side rail 16 is laterally and longitudinally spaced from the corresponding second portion 16A of the other longitudinal side rail members 16 such that each of the respective forward and rearward axle beams 20, 22 extending between the first and second portions 16A, 16B of the longitudinal side rail members 16 is arranged in the aforementioned oblique relationship thereto, for example as much as an angular displacement of 20° away from a perpendicular line intersecting the vertical pivotal axes V of the respective kingpin assemblies 36. The aforesaid oblique arrangements of the axle beams 20, 22 permit them to have sufficient length to undergo the independent vertical pivotal movements that provide the extended ranges of vertical travel from neutral positions of the respective wheels 14 supported on the axle beams 20, 22 without the respective vertical pivotal axes V significantly tilting away from true vertical alignment with a vertical reference.

The elongated right and left radius arms 24, 26 of the suspension system 10 pivotally interconnect the longitudinal side rail members 18 of the chassis 12 with the respective forward and rearward axle beams 20, 22 adjacent to where the axle beams 20, 22 are pivotally connected to the respective wheels 14 about respective vertical pivotal axes V defined by the kingpin assemblies 36. In such manner, the right and left radius arms 24, 26 serve to control fore and aft movements of the axle beams 20, 22 during their respective vertical pivotal movements and thereby maintain the vertical pivotal axes V close to true vertical alignment with a vertical reference over the extended range of vertical travel of the wheels 14.

More particularly, as in the case of the axle beams 20, 22, the right and left radius arms 24, 26 are generally straight, extend generally parallel to one another and pivot in generally parallel vertical planes. Also, the radius arms 24, 26 are generally horizontally-disposed and each is independent of one another. Each of the right and left radius arms 24, 26 at one end 24A, 26A thereof is pivotally connected to the one end 20A, 22A of one of the respective forward and rearward axle beams 20, 22 where they are pivotally connected about the vertical pivotal axes V to the wheels 14. Each of the right and left radius arms 24, 26 at an opposite end 24B, 26B thereof are interconnected to longitudinally spaced third portion 16C of the opposite longitudinal side rail members 16 of the chassis 12 via respective braces 40 fixed to and extending downwardly from the third portions 16C of the side rail members 16. In such manner, the right and left radius arms 24, 26 control and limit any possible fore and aft movements of the axle beams 20, 22 during their vertical pivotal movements and also maintain the vertical pivotal axes V of the kingpin assemblies 36 at the one ends 20A, 22A of the axle beams 20, 22 close to true vertical alignment with a vertical reference over the extended range of vertical travel of the wheels 14.

The elongated right and left torque links 28, 30 of the suspension system 10 pivotally interconnect the first portions 16A of the longitudinal side rail members 16 of the chassis 12 with the forward and rearward axle beams 20, 22 adjacent where the axle beams 20, 22 respectively pivotally connect to the second portions 16B of the longitudinal side rail members 16 of the chassis 12 about the horizontal pivotal axes H. In such manner, the torque links 28, 30 counteract rotational forces introduced to the respective forward and rearward axle beams 20, 22 by the acceleration and braking of the wheels 14 of the vehicle.

More particularly, as in the cases of the axle beams 20, 22 and radius arms 24, 26, the right and left torque links 28, 30 are generally straight, extend generally parallel to one another and pivot in generally parallel vertical planes. Also, the right and left torque links 28, 30 are generally horizontally-disposed and each is independent of one another. The torque links 28, 30 are pivotally interconnected at opposite ends 28A, 30A and 28B, 30B to one of the first portions 16A of the opposite side rail members 16 of the chassis 12 via pairs of upper and lower clevis plates 42 and to the other end 20B, 22B of each of the forward and rearward axle beams 20, 22 via upright posts 44 fixed on and extending upwardly from the other ends 20B, 22B of the axle beams 20, 22. In such manner, the torque links 28, 30 counteract any rotational forces introduced to the forward and rearward axle beams 20, 22 by acceleration and braking of the wheels 14 of the vehicle. The torque links 28, 30 by being located adjacent to the other ends 20B, 22B of the forward and rearward axle beams 20, 22, where they are pivotally connected about the horizontal pivotal axes H to the second portions 16B of the opposite longitudinal side rail members 16 of the chassis 12, cause only minimal tilting of the vertical pivotal axes V between the one ends 20A, 22A of the axle beams 20, 22 and the wheels 14 relative to the vertical reference.

The pair of spring means 32, 34 of the suspension system 10 are positioned under the longitudinal side rail members 16 of the chassis 12 and adjacent to the one ends 20A, 22A of the forward and rearward axle beams 20, 22 where they are pivotally connected about the vertical pivotal axes V to the respective wheels 14. In such manner, the spring means 32, 34 cushion the ride of the chassis 12 as the vehicle traverses the ground terrain. More particularly, each of the spring means 32, 34 includes a pair of air bags 46 supported under each of the first portions 16A of the opposite longitudinal side rail members 16 of the chassis 12 along opposite sides of each of the one ends 20A, 22A of the forward and rearward axle beams 20, 22. Each of the spring means 32, 34 also includes a pair of brackets 48 attached to and extending in opposite directions from the opposite sides of the one ends 20A, 22A of the forward and rearward axle beams 20, 22 with each of the air bags 46 seated upon one of the brackets 48.

It should be pointed out that bushings 50 made of resiliently compressible material pivotally connect the other ends 20B, 22B of the axle beams 20, 22 to the hangers 38, pivotally connect the opposite ends 24A, 26A and 24B, 26B of the radius arms 24, 26 to the one ends 20A, 22A of the axle beams 20, 22 and to the third portions 16C of the longitudinal side rail members 16, pivotally connect the opposite ends 28A, 30A and 28B, 30B of the torque links 28, 30 to the first portions 16A of the longitudinal side rail members 16 and other ends 20B, 22B of the axle beams 20, 22, so as to allow a slight amount or degree of universal side-to-side swiveling of the axle beams 20, 22, radius arms 24, 26 and torque links 28, 30 as they primarily pivot in the vertical planes so as to accommodate the movements of the axle beams 20, 22, radius arms 24, 26 and torque links 28, 30 along their generally arcuate paths.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. In a vehicle having at least a pair of rotatable wheels and a chassis with a pair of longitudinally-extending opposite sides, an independent suspension system comprising:
   (a) a pair of generally horizontally-disposed elongated axle beams each independent of one another and supporting one of the rotatable wheels adjacent to a first portion of one of the opposite sides of the chassis, each of said axle beams at one end of a pair of opposite ends thereof being pivotally connected about a generally vertical pivotal axis to the one of the rotatable wheels, each of said axle beams at an other of said opposite ends thereof interconnecting one of the rotatable wheels with a second portion of one of the opposite sides of the chassis being laterally and longitudinally spaced from the corresponding first portion thereof such that said axle beams undergo independent pivotal movements providing for an extended range of vertical travel from a neutral position of each of the rotatable wheels supported on one of said respective axle beams;
   (b) means for cushioning the chassis as the vehicle traverses terrain, said means for cushioning the chassis being positioned under the first portions of the opposite sides of the chassis and adjacent to said one ends of said axle beams that are pivotally connected about said vertical pivotal axes to the respective wheels;
   (c) a pair of torque links each independent of one another pivotally interconnected at opposite ends to one of the first portions of the opposite sides of the chassis and to said other end of each of said axle beams so as to counteract rotational forces introduced to said axle beams by acceleration and braking of the vehicle, said torque links in being located adjacent to said other ends of said axle beams, where said axle beams are pivotally connected about horizontal pivotal axes to the second portions of the opposite sides of the chassis, restrain tilting of said vertical pivotal axes, about which said one ends of said axles are pivotally connected to the wheels, relative to a vertical reference at said one ends of said axle beams: and
   (d) a pair of radius arms pivotally interconnecting said axle beams at said one ends thereof with third portions of the opposite sides of the chassis longitudinally spaced from the respective first and second portions thereof, each of said radius arms at one end being pivotally connected to said one end of said respective axle member where said axle member is pivotally connected about said vertical pivotal axis to one of the wheels and is pivotally connected at an opposite end to the longitudinally spaced third portion of the chassis so as to control fore and aft movement of said axle beam during vertical pivotal movement of said axle member and to maintain said vertical pivotal axis between said one end of each axle beam and the one wheel close to true vertical alignment with the vertical reference over said extended range of vertical travel.

2. The suspension system of claim 1 wherein said axle beams are generally straight, extend generally parallel to one another and pivot in generally parallel vertical planes.

3. The suspension system of claim 2 wherein said axle beams extend in oblique relationships to the longitudinally-extending opposite sides of the chassis that permit independent pivotal movements of said axle beams allowing the extended range of vertical travel from a neutral position of each of the wheels supported on said respective axle beam.

4. The suspension system of claim 1 wherein said for cushioning the chassis means includes a pair of air bags supported under each of the first portions of the opposite sides of the chassis along opposite sides of each of said one ends of said axle beams and a pair of brackets attached to and extending in opposite directions from said opposite sides of said one ends of said axle beams with each of said air bags seated upon one of said brackets.

5. In a vehicle having at least a pair of rotatable wheels and a chassis with a pair of longitudinally-extending opposite sides, an independent suspension system comprising:

(a) a pair of generally horizontally-disposed elongated axle beams each independent of one another supporting one of the rotatable wheels adjacent to a first portion of one of the opposite sides of the chassis, each of said axle beams interconnecting one of the rotatable wheels with a second portion of one of the opposite sides of the chassis being laterally and longitudinally spaced from the corresponding first portion thereof such that said axle beams extend in oblique relationships to the longitudinally-extending opposite sides of the chassis that permit independent pivotal movements thereof that allows an extended range of vertical travel from a neutral position of each of the wheels supported on one of said respective axle beams, each of said axle beams at one end thereof being pivotally connected about a generally vertical pivotal axis to the one of said rotatable wheels, each of said axle beams at an opposite other end thereof being pivotally connected about a generally horizontal pivotal axis to the second portion of one of the opposite sides of the chassis;

(b) a pair of radius arms independent of one another pivotally interconnecting said axle beams at said other of said opposite ends thereof with third portions of the opposite sides of the chassis longitudinally spaced from the second portions thereof where said axle beams are pivotally connected at said other ends thereof, each of said radius arms at one end being pivotally connected to said one end of said respective axle members to where said axle member is pivotally connected about said vertical pivotal axis to one of the wheels and at an opposite end being pivotally connected to the third portion of the opposite sides of the chassis so as to control fore and aft movement of said axle beam during vertical pivotal movement thereof and thereby maintain said vertical pivotal axis between said one end of each axle beam and the one wheel close to true vertical alignment with a vertical reference over the extended range of vertical travel;

(c) a pair of means for cushioning the chassis as the vehicle traverses terrain, being respectively positioned under the first portions of the opposite sides of the chassis and adjacent to the one ends of said axle beams that are pivotally connected about said vertical pivotal axes to the wheels, each of said means for cushioning the chassis including a pair of air bags supported under each of the first portions of the opposite sides of the chassis along opposite sides of each of said one ends of the axle beams and a pair of brackets attached to and extending in opposite directions from said opposite sides of said one ends of said axle beams with each of said air bags seated upon one of said brackets; and (d) a pair of torque links each independent of one another pivotally interconnected at opposite ends to one of the first portions of the opposite sides of the chassis and to said other end of each of said axle beams so as to counteract rotational forces introduced to said axle beams by the acceleration and braking of the vehicle, said torque links in being located adjacent to said other ends of said axle beams, where said axle beams are pivotal connected at horizontal pivotal axes to the second portions of the opposite sides of the chassis, restrain tilting of said vertical pivotal axes, relative to the vertical reference at said one ends of said axle beams.

* * * * *